United States Patent
Wang et al.

(10) Patent No.: US 8,989,736 B2
(45) Date of Patent: Mar. 24, 2015

(54) METHODS AND APPARATUSES FOR DETERMINING RESELECTION PARAMETERS FOR DETECTED CELLS

(71) Applicant: QUALCOMM Incorporated, San Diego, CA (US)

(72) Inventors: Fan Wang, Sunnyvale, CA (US); An-Swol C. Hu, Belmont, CA (US); Sundaresan Tambaram Kailasam, San Diego, CA (US); Uzma Khan, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 13/786,681

(22) Filed: Mar. 6, 2013

(65) Prior Publication Data

US 2014/0038597 A1     Feb. 6, 2014

Related U.S. Application Data

(60) Provisional application No. 61/678,488, filed on Aug. 1, 2012.

(51) Int. Cl.
  *H04W 4/00*     (2009.01)
  *H04W 36/16*    (2009.01)
  *H04W 36/00*    (2009.01)

(52) U.S. Cl.
  CPC ........ *H04W 36/165* (2013.01); *H04W 36/0083* (2013.01)
  USPC ...................................................... 455/434

(58) Field of Classification Search
  CPC . H04W 36/0083; H04W 48/04; H04W 48/16; H04W 84/045; H04W 8/183; H04W 36/165; H04W 36/22
  USPC ...................................................... 455/434
  See application file for complete search history.

(56) References Cited

U.S. PATENT DOCUMENTS 8,126,499 B2    2/2012    Tenny
2010/0184434 A1 7/2010    Jeong et al.
(Continued)

FOREIGN PATENT DOCUMENTS

GB     2474503 A     4/2011

OTHER PUBLICATIONS

"3rd Generation Partnership Project; Technical Specification Group Radio Access Network; User Equipment (UE) procedures in idle mode and procedures for cell reselection in connected mode (Release 10); Excerpt pp. 1-4, 22-37", 3GPP Standard; 3GPP TS 25.304, 3rd Generation Partnership Project (3GPP), Mobile Competence Centre ; 650, Route Des Lucioles ; F-06921 Sophia-Antipolis Cedex ; France, vol. RAN WG2, No. V10.5.0, Jun. 26, 2012, pp. 1-52.
(Continued)

*Primary Examiner* — Kwasi Karikari
(74) *Attorney, Agent, or Firm* — Darren M. Simon

(57) ABSTRACT

The present disclosure presents a method and apparatus for determining reselection parameters for detected cells. For example, the method may include receiving system information block (SIB) data associated with one or more cells in a neighbor cell list (NCL). In such example, the SIB data may include a ranking offset parameter associated with each of the NCL cells. Furthermore, such an example method may include detecting a cell that is not in the NCL, determining a reselection ranking value associated with each of the NCL cells, the detected cell and the serving cell. In addition, in some examples, such method may include ranking the one or more NCL cells, the detected cell and the serving cell in a ranking list based on the reselection ranking values. As such, reselection parameters for detected cells may be determined.

25 Claims, 10 Drawing Sheets

(56) References Cited

U.S. PATENT DOCUMENTS

| | | | |
|---|---|---|---|
| 2011/0105123 A1* | 5/2011 | Lee et al. | 455/436 |
| 2011/0143738 A1* | 6/2011 | Kone | 455/418 |
| 2011/0255509 A1 | 10/2011 | Huang et al. | |
| 2012/0176918 A1 | 7/2012 | Callender et al. | |
| 2012/0282931 A1 | 11/2012 | Giustina et al. | |
| 2014/0206355 A1* | 7/2014 | Pani et al. | 455/436 |

OTHER PUBLICATIONS

International Search Report and Written Opinion—PCT/US2013/053309—ISA/EPO—Feb. 5, 2014.

3GPP TS 25.304: "Universal Mobile Telecommunications System (UMTS); User Equipment (UE) procedures in idle mode and procedures for cell reselection in connected mode," ETSI TS 125 304 Version 10.7.0, Release 10, Jan. 2013, pp. 53.

* cited by examiner

METHODS AND APPARATUSES FOR DETERMINING RESELECTION PARAMETERS FOR DETECTED CELLS

CLAIM OF PRIORITY UNDER 35 U.S.C. §119

The present application for patent claims priority to U.S. Provisional Patent Application No. 61/678,488 filed Aug. 1, 2012, entitled "Methods and Apparatuses for Determining Reselection Parameters for Detected Cells," which is assigned to the assignee hereof, and hereby expressly incorporated by reference herein.

BACKGROUND

1. Field

Aspects of the present disclosure relate generally to wireless communication systems, and more particularly, to improving cell reselection.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

For example, in some current cell reselection methods, such as the methods used in WCDMA-to-WCDMA (W2W) intra-frequency reselection scenarios where a user equipment (UE) is in an idle mode or CELL_FACH, CELL_PCH, or other 3GPP-defined UE state, the UE is often configured to allow cell reselection from a current serving cell to a detected cell that is not included in a neighbor cell list maintained and communicated by the current serving cell in a system information block (SIB) message. Typically, reselection to these non-NCL detected cells is only permitted if the signal-to-noise ratio (e.g. Ec/Io) associated with the current serving cell $Q_{qualmeas}$ is higher than a minimum allowable signal quality value $Q_{qualmin}$.

But even where such non-NCL detected cell reselection is allowed, the signal quality of these detected cells are often ranked against those of the NCL cells before determining to which cell the UE should be reselected. Most often, this ranking is performed by computing a ranking value for each NCL and non-NCL cell according to a ranking value function, which includes a reselection weighting parameter, $Q_{offset}$. This offset parameter serves to weigh a ranking value toward or against reselection to any particular cell. For NCL cells, the $Q_{offset}$ value is determined, managed, and/or communicated to the UE by the serving cell via the SIB message, such as the SIB11 (or SIB12 when the UE is in a CELL_FACH state). However, the $Q_{offset}$ values of any detected cells not in the NCL are not defined in the SIB11 transmitted by the serving cell. Thus, in scenarios where detected cells must be ranked against NCL cells before a reselection decision is made, the UE must somehow obtain a $Q_{offset}$ value for the detected cells to evaluate the detected cell ranking values before ranking and reselection may be performed.

According to some legacy cell reselection methods, UEs or networks set the $Q_{offset}$ value of any non-NCL cell to zero where the appropriate $Q_{offset}$ value is not included in the received SIB11. However, because the $Q_{offset}$ value of a cell is inversely proportional to the likelihood that the cell is selected for reselection and NCL cells often have a positive $Q_{offset}$ value in the SIB 11, these legacy cell reselection methods favor reselection toward non-NCL detected cells.

In other words, a UE that utilizes these legacy methods may prefer reselection to non-NCL cells over NCL cells. This may become problematic, however, as detected non-NCL cells often exhibit low signal quality and lower communication capability as compared to network-preferred NCL cells, and reselection to these cells may result in call drops and degradation in user experience.

Moreover, the problem gets worse if one or more femtocells are present in the vicinity of the UE. In traditional wireless systems, the network commands UEs to favor reselection to femtocells by setting each femtocell $Q_{offset}$ to zero. Thus, if all non-NCL detected cell $Q_{offset}$ values are set to zero, UEs and networks lose the advantage of using a cell $Q_{offset}$ value to distinguish between macro cells and femtocells.

Thus, there is a need for a method and apparatus for improved cell reselection.

SUMMARY

The following presents a simplified summary of one or more aspects in order to provide a basis understanding of such aspects. This summary is not an extensive overview of all contemplated aspects, and is intended to neither identify key or critical elements of all aspects not delineate the scope of any or all aspects. Its sole purpose is to present some concepts of one or more aspects in a simplified form as a prelude to the more detailed description that is presented later.

The present disclosure presents example method and apparatus for wireless communication. For example, the present disclosure presents an example method for wireless communication that includes receiving system information block (SIB) data associated with one or more cells in a neighbor cell list (NCL), wherein the SIB data comprises a ranking offset parameter associated with each of the NCL cells. In addition, such method may include detecting a cell that is not in the NCL, determining a reselection ranking value associated with each of the NCL cells, the detected cell and the serving cell, and ranking the one or more NCL cells, the detected cell and the serving cell in a ranking list based on the reselection ranking values.

In an additional aspect, the present disclosure presents an example apparatus for wireless communication, which may include means for receiving system information block (SIB) data associated with one or more cells in a neighbor cell list (NCL), wherein the SIB data comprises a ranking offset parameter associated with each of the NCL cells. In addition, such apparatus may include means for detecting a cell that is not in the NCL, means for determining a reselection ranking value associated with each of the NCL cells, the detected cell and the serving cell, and means for ranking the one or more NCL cells, the detected cell and the serving cell in a ranking list based on the reselection ranking values.

Moreover, the present disclosure presents an example computer program product, which may include a computer-readable medium comprising code for receiving system information block (SIB) data associated with one or more cells in a neighbor cell list (NCL), wherein the SIB data comprises a ranking offset parameter associated with each of the NCL cells. In addition, such computer program product may further include code for detecting a cell that is not in the NCL, determining a reselection ranking value associated with each of the NCL cells, the detected cell and the serving cell, and ranking the one or more NCL cells, the detected cell and the serving cell in a ranking list based on the reselection ranking values.

In a further aspect, the present disclosure presents an apparatus for wireless communication, includes a system information block (SIB) parameter receiving component configured to receive SIB data associated with one or more cells in a neighbor cell list (NCL), wherein the SIB data comprises a ranking offset parameter associated with each of the NCL cells. In addition, the apparatus may be further include a cell detecting component configured to detect a cell that is not in the NCL, a reselection ranking value determining component configured to determine a reselection ranking value associated with each of the NCL cells, the detected cell and the serving cell, and a cell ranking component configured to rank the one or more NCL cells, the detected cell and the serving cell in a ranking list based on the reselection ranking values.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure provides methods and apparatuses for improved cell reselection in wireless systems by ranking reselection candidate non-NCL detected cells against NCL cells based on a cell-specific computed reselection ranking value, which may be a function of a ranking offset value $Q_{offset}$ associated with each cell. In an aspect, the reselection ranking value of detected cells (non-NCL cells) may be a function the $Q_{offset}$ values associated with the NCL cells. For example, in an aspect, the UE may set the $Q_{offset}$ of each detected cell to the maximum $Q_{offset}$ of the cells in the NCL, thus deterring UE reselection to detected cells not in the NCL received from a serving cell. In an additional aspect, the UE may set the $Q_{offset}$ associated with any detected femtocells or femtocells included in the NCL to zero, thereby shading the UE toward femtocell reselection.

Figure 1:
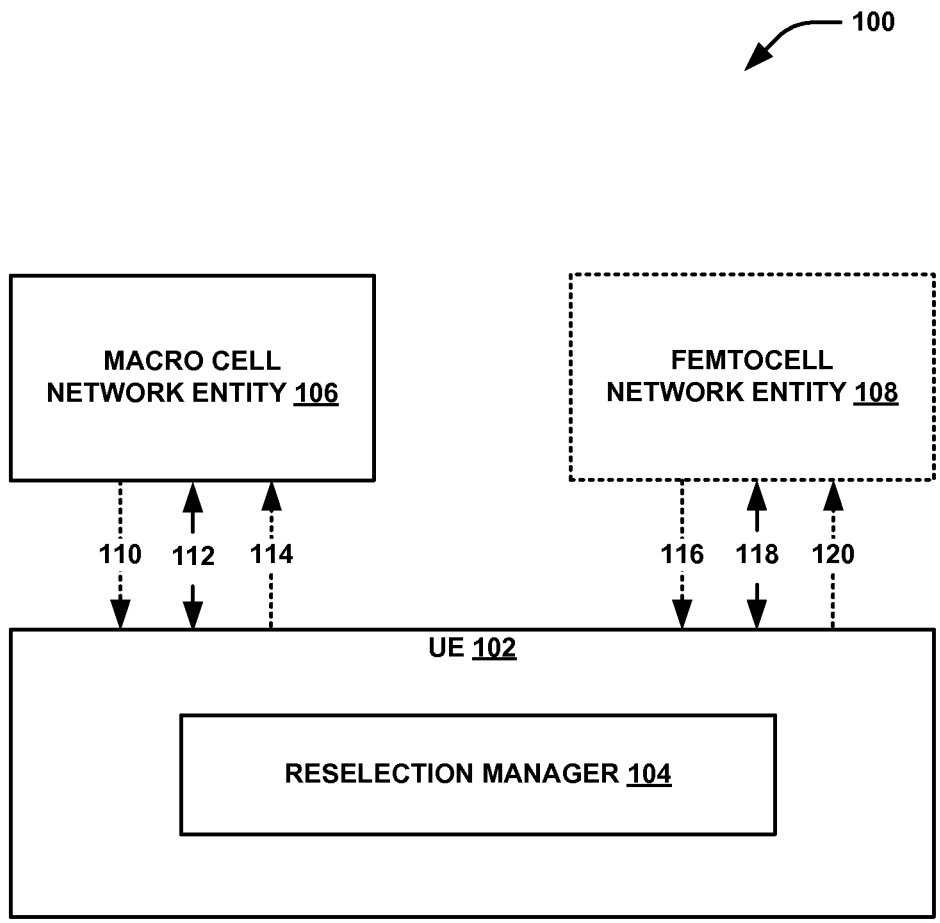
FIG. 1 is a block diagram illustrating an example wireless system of aspects of the present disclosure.

Referring to FIG. 1, a wireless communication system 100 is illustrated that facilitates improved cell reselection. System 100 includes a UE 102 that may communicate with one or more network entities, which may include one or more macro cell network entities 106 and/or one or more optional femtocell network entities 108 via one or more over-the-air links 112 and/or 118, respectively. Furthermore, the one or more macro cell network entities 106 and/or one or more femtocell network entities 108 may each be associated with a macro cell or a femtocell, each of which may be a candidate for serving cell reselection or handover.

In an additional aspect, UE 102 may be configured to transmit one or more messages 114 and/or 120 to macro cell network entity 106 and/or femtocell network entity 108, respectively. In an aspect, messages 114 and/or 120 may include, but are not limited to, cell measurement reports, data packets, signaling messages, cell discovery indicators, cell ranking information, handover target cell selection, etc. Additionally, UE 102 may receive one or more signals or messages 110 and/or 116 from macro cell network entity 106 and/or femtocell network entity 108, respectively. In an aspect, messages 110 and/or 116 may include, but are not limited to, pilot or beacon signals, system information block (for example, SIB, SIB 11, etc.) data or parameter information, reselection commands, neighbor cell list (NCL) information, femtocell information, closed subscriber group (CSG) information, etc.

Furthermore, UE 102 may include a reselection manager 104, which may be configured to detect one or more cells not included in a NCL, determine a reselection ranking value for each NCL cell, detected cell and the serving cell, and rank the NCL cells, detected cell and the serving cell in a ranking list based on the reselection ranking values. The ranking list may then be used by UE 102 and/or reselection manager 104 when performing a cell reselection procedure.

In an additional aspect, UE 102 may be a mobile apparatus and may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. Additionally, macro cell network entity 106 of system 100 may include one or more of any type of network component, such as an access point, including a base station (BS) or a node B, a relay, a peer-to-peer device, an authentication, authorization and accounting (AAA) server, a mobile switching center (MSC), a radio network controller (RNC), etc. Furthermore, femtocell network entity 108 may be a small base station, microcell, cellular repeater, pico cell, etc.

Figure 2:
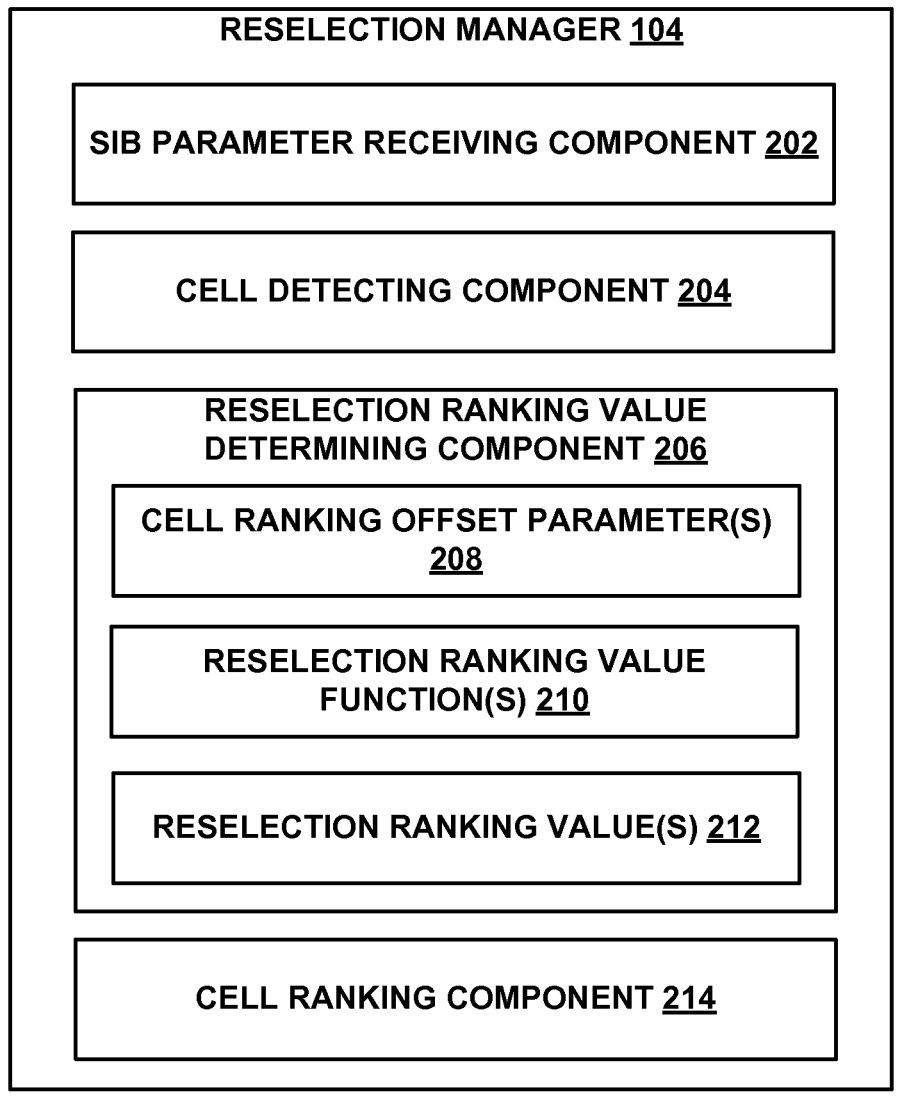
FIG. 2 is a block diagram illustrating an example reselection manager in aspects of the present disclosure.

FIG. 2 illustrates, for example, a reselection manager 104, which can be configured to receive system information block (SIB) data associated with one or more cells in a neighbor cell list (NCL), detect a cell that is not in the NCL (referred to as "detected cell" in the present disclosure), determine a reselection ranking value associated with each of the NCL cells, the detected cell and the serving cell, and rank the one or more NCL cells, the detected cell and the serving cell in a ranking list based on the reselection ranking value. In an aspect, reselection manager 104 can include, for example, a system information block (SIB) parameter receiving component 202, which can be configured to receive one or more SIBs (for example, SIB 11, SIB 12, etc.) from a cell serving UE 102 (referred to as the "serving cell") that may include SIB parameters associated with the one or more cells in the NCL.

In an aspect, SIB parameter receiving component 202 can be configured to receive SIB parameter(s) or data/information, for example, by utilizing an autonomous search function (ASF). The ASF, as per Third Generation Partnership Project (3GPP) specifications, can determine when and where to search for allowed CSG cells.

In an aspect, SIB parameters may include one or more cell-specific parameters that may be used to calculate one or more of a serving cell ranking value, a NCL cell ranking value, and a detected cell ranking value. In an aspect, UE 102 can detect cells that are not in the NCL, for example, via cell detecting component 204. In an aspect the detected cells may be limited to include cells that exhibit a signal-to-noise ratio (for example, Ec/Io or Ec/No) that is above a network-specified threshold value for cells to be included in the NCL or otherwise considered an allowable cell for reselection.

Additionally, SIB parameters received may include, for example, a signal quality value '$Q_{meas}$' for the serving cell, for example, $Q_{meas,s}$, and one or more NCL cells, for example, $Q_{meas,n}$. In an aspect, $Q_{meas,s}$ and $Q_{meas,n}$ can be the corresponding Reference Signal Received Power (RSRP) values and/or Received Signal Code Power (RSCP) values. The SIB parameters may also include a hysteresis parameter '$Q_{hyst}$' associated with a cell, for example, a serving cell, that the cell may advertise to discourage a UE from bouncing back and forth between cells as signal levels fluctuate, and/or a timer offset value '$TO_n$' associated with a neighbor cell, for example, a NCL cell. The timer offset value may be relevant for cell ranking where Hierarchical Cell Structure (HCS) is used as a cell structure associated for a cell. Furthermore, the SIB parameters may include a '$L_n$' parameter value, where $L_n$ is 0 if the HCS level of the serving cell is equal to that of the neighbor cell, for example, a NCL cell, and is 1 otherwise. In some examples, the value of $L_n$ may be alternatively or additionally calculated by the UE.

Moreover, the SIB parameters may include one or more cell ranking offset parameters '$Q_{offset}$' 208 that may be used by the UE (or a network entity 106, 108) when calculating (for example, at reselection ranking value determining component 206) a reselection ranking value associated with a serving cell (for example, $Q_{offset,s}$ and/or $Q_{offset_{mbms}}$) or a macro cell or a femtocell (for example, $Q_{offset_n}$ and/or $Q_{offset_{s,n}}$) in a macro cell NCL or a femtocell NCL or other network-approved cell list. In an aspect, the $Q_{offset}$ value may be an offset value between two cells utilized by reselection ranking value function 210. In an aspect, a positive $Q_{offset}$ value may deter the UE from camping on a cell, whereas a low positive, zero, or negative $Q_{offset}$ value may indicate that a cell may be an attractive candidate for reselection. In an additional aspect, $Q_{offset}$ may be specified as $Q_{offset1}$ where a RSCP is used as a cell measurement metric, and/or $Q_{offset}$ may be specified as $Q_{offset2}$ where Ec/Io or Ec/No is used as a cell measurement metric.

In an aspect, reselection ranking value determining component 206 can be configured to include reselection ranking value function(s) 212 to compute reselection ranking values 212. Furthermore, reselection ranking value determining component 206 can obtain cell ranking offset parameters 208 that may be included in a received SIB, for example, $Q_{offset,s}$, $Q_{offsetmbms}$, $Q_{offset_n}$, and/or the offset of a NCL cell relative to the serving cell, $Q_{offset_{s,n}}$, associated with the serving cell and/or cells in the NCL or other network-approved cell list, from SIB parameter receiving component 202, and can use the cell ranking offset parameters 208 to compute reselection ranking values 212 associated with the NCL cells based on one or more reselection ranking value functions 210.

In an aspect, SIB data received from the serving cell of a UE may not include some or all of the cell ranking offset parameters 208 associated with a detected cell not in the NCL. In some examples, the received SIB may not contain detected cell $Q_{offset}$ parameters. In an aspect, reselection ranking value determining component 206 can compute a reselection ranking value 212 associated with a detected cell based on an algorithm that is a function of some or all of the cell ranking offset parameters 208 of the NCL cells received in a SIB message transmitted by the UE's serving cell. In a non-limiting aspect of the present disclosure, where each $Q_{offset_n}$ value associated with each NCL cell is negative, the reselection ranking value determining component 206 may set the $Q_{offset}$ value of any detected cell ($Q_{offset,detected}$) to zero. In an additional or alternative aspect, the reselection ranking value determining component 206 may set the $Q_{offset,detected}$ of a detected cell to equal the maximum $Q_{offset}$ value of the one or more NCL cells, for example, $$Q_{offset,detected} = \max\big|_1^i \{Q_{offset_{s,n_i}}\}$$

By setting the $Q_{offset}$ value of the detected cells (non-NCL cells) to the maximum $Q_{offset}$ of value of the NCL cells, the UE and/or a network entity may deter UE reselection of a detected cell (non-NCL cell) as remaining camped on the UE's current serving cell or reselection to an acceptable cell in the NCL would provide more robust wireless communication services compared to reselection to the detected cell.

In an additional aspect, reselection ranking value determining component 206 may obtain the cell ranking offset parameter 208 values (e.g., $Q_{offset}$ or $Q_{offset_{s,n}}$) associated with each cell in the NCL (or other approved cell list that may include macro and/or femtocells) from the SIB parameter receiving component 202, store the cell ranking offset parameters 208, and utilize the cell ranking offset parameters 208 when computing a reselection ranking value 212 associated with each NCL cell. Additionally, in an aspect, the UE may set the cell ranking offset parameter 208 associated with any detected femtocell (not in the NCL) to zero, thereby increasing the chances that the UE reselects the detected femtocell.

In an aspect, reselection manager 104 can be configured to compute one or more reselection ranking values 212 associated with a serving cell, a NCL cell, or a detected cell based on one or more reselection ranking value functions 210. In an aspect, each of the cells can be, for example, a macro cell, a femtocell, or a pico cell. In an example aspect, a reselection ranking value function 210 computes a serving cell reselection ranking value, which may be ranked against any detected or approved reselection candidate cells (for example, NCL cells) to determine whether the UE should remain camped on the serving cell or whether the UE and/or network devices should initiate reselection procedures to change the UE's serving cell to a higher-ranked detected or approved reselection candidate cell (for example, a NCL cell). For example, in a non-limiting aspect, the serving cell reselection ranking value $R_s$ associated with a current serving cell may be computed by the following reselection ranking value function:

$$R_s = Q_{meas,s} + Q_{hyst_s} + Q_{offset_{mbms}}$$

In an additional aspect, reselection ranking value determining component 206 may determine a non-serving cell reselection ranking value $R_n$ associated with each non-serving macro cell and/or femtocell, which may include some or all of the detected cells (non-NCL cells) and/or NCL cells. In some non-limiting examples, a $R_n$ value may be computed by evaluating the following reselection ranking value function:

$$R_n = Q_{meas,n} - Q_{offset_{s,n}} + Q_{offset_{mbms}} - [TO_n \times (1 - L_n)]$$

Furthermore, when computing the $R_n$ of a detected cell, the UE and the reselection ranking value determining component 206 may obtain one or more of the parameters $Q_{meas,n}$, $Q_{offset_{s,n}}$, $Q_{offset_{mbms}}$, $TO_n$, and $L_n$ from a detected cell, serving cell, or by computing the parameters internally based on one or more other known parameters or reading a default value of any of the parameters from the UE's memory.

Additionally, reselection manager 104 may include a cell ranking component 214, which can be configured to assemble a ranking list by ranking each of the detected cells, serving cell, and/or NCL cells. In an aspect, cell ranking component 214 may rank the cells according to reselection ranking values 212, which may be obtained from the reselection ranking value determining component 206 and/or stored at the cell ranking component 214. Furthermore, where a current serving cell is the highest-ranked cell in the ranking list, the UE, serving cell network, or highest-ranked cell network may not trigger reselection. Alternatively, where a detected cell or NCL cell is the highest-ranked cell in the ranking list, the UE, serving cell network, or highest-ranked cell network may initiate reselection to change the serving cell of the UE to the highest-ranked cell.

In addition, the functional aspects and/or structure of the UE 102 and/or reselection manager 104 (FIGS. 1 and 2) described above may be utilized for one or more of macro cell to macro cell reselection, which may include WCDMA to WCDMA (W2W) or WCDMA to LTE (W2L) reselection, intra-frequency reselection, inter-frequency reselection, macro cell to femtocell reselection, femtocell to macro cell reselection, or any other serving cell reselection arrangement. In addition, the present methods or functional aspects may be performed or executed by a UE in an idle mode or CELL_FACH, CELL_PCH, or other 3GPP defined or non-3GPP-defined UE state. Moreover, reselection to CSG cells has not yet been standardized for UEs in the CELL_FACH state. Thus, the present disclosure presents efficient and effective methods and apparatuses for performing such CSG cell reselection for UEs in the CELL_FACH state.

Furthermore, these functional aspects may be performed by devices (for example, UEs) that utilize autonomous search function (ASF) methods for cell measurement and/or reselection. This may include devices implementing intra-frequency ASF, where one or more CSG cells may be required to be ranked alongside macro cells. CSG cells may frequently exhibit more robust wireless communication services relative to detected and NCL macro cells. Thus, in an additional or alternative aspect, the UE may set the $Q_{offset}$ associated with a detected non-NCL CSG cell to zero to increase the likelihood of the UE reselecting to a CSG cell instead of a detected or NCL macro cell.

Figure 3:
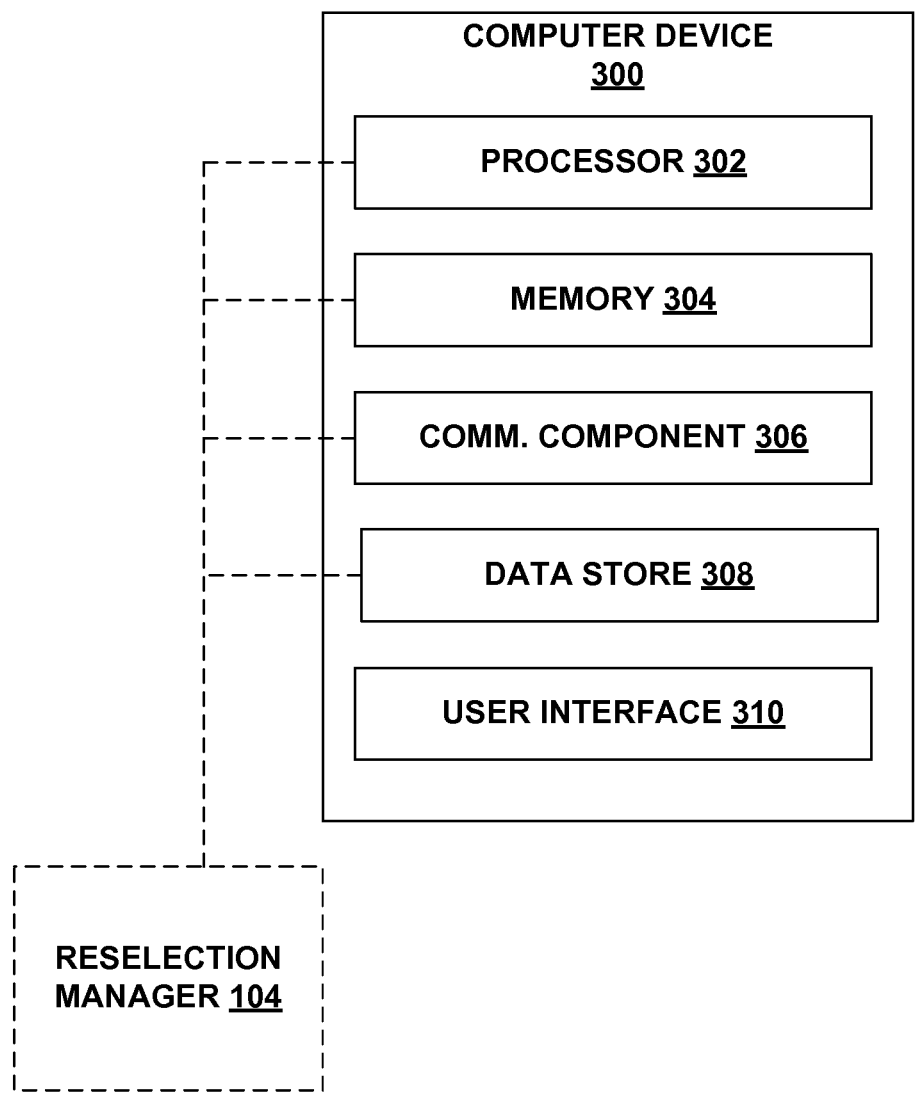
FIG. 3 is a block diagram illustrating aspects of a computer device according to the present disclosure.

Referring to FIG. 3, in one aspect, any of UE 102, macro cell network entity 106, and femtocell network entity 108 (FIG. 1) may be represented by a specially programmed or configured computer device 300. In one aspect of UE implementation (for example, UE 102 of FIG. 1), computer device 300 may include reselection manager 104 (FIGS. 1 and 2), such as in specially programmed computer readable instructions or code, firmware, hardware, or some combination thereof. Computer device 300 includes a processor 302 for carrying out processing functions associated with one or more of components and functions described herein. Processor 302 can include a single or multiple set of processors or multi-core processors. Moreover, processor 302 can be implemented as an integrated processing system and/or a distributed processing system.

Computer device 300 further includes a memory 304, such as for storing data used herein and/or local versions of applications being executed by processor 302. Memory 304 can include any type of memory usable by a computer, such as random access memory (RAM), read only memory (ROM), tapes, magnetic discs, optical discs, volatile memory, non-volatile memory, and any combination thereof.

Further, computer device 300 includes a communications component 306 that provides for establishing and maintaining communications with one or more parties utilizing hardware, software, and services as described herein. Communications component 306 may carry communications between components on computer device 300, as well as between computer device 300 and external devices, such as devices located across a communications network and/or devices serially or locally connected to computer device 300. For example, communications component 306 may include one or more buses, and may further include transmit chain components and receive chain components associated with a transmitter and receiver, respectively, or a transceiver, operable for interfacing with external devices. In an additional aspect, communications component 306 may be configured to receive one or more pages from one or more subscriber networks. In a further aspect, such a page may correspond to the second subscription and may be received via the first technology type communication services.

Additionally, computer device 300 may further include a data store 308, which can be any suitable combination of hardware and/or software, that provides for mass storage of information, databases, and programs employed in connection with aspects described herein. For example, data store 308 may be a data repository for applications not currently being executed by processor 302 and/or any threshold values or finger position values.

Computer device 300 may additionally include a user interface component 310 operable to receive inputs from a user of computer device 300, and further operable to generate outputs for presentation to the user. User interface component 310 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 310 may include one or more output devices, including but not limited to a display, a speaker, a haptic feedback mechanism, a printer, any other mechanism capable of presenting an output to a user, or any combination thereof.

Figure 4:
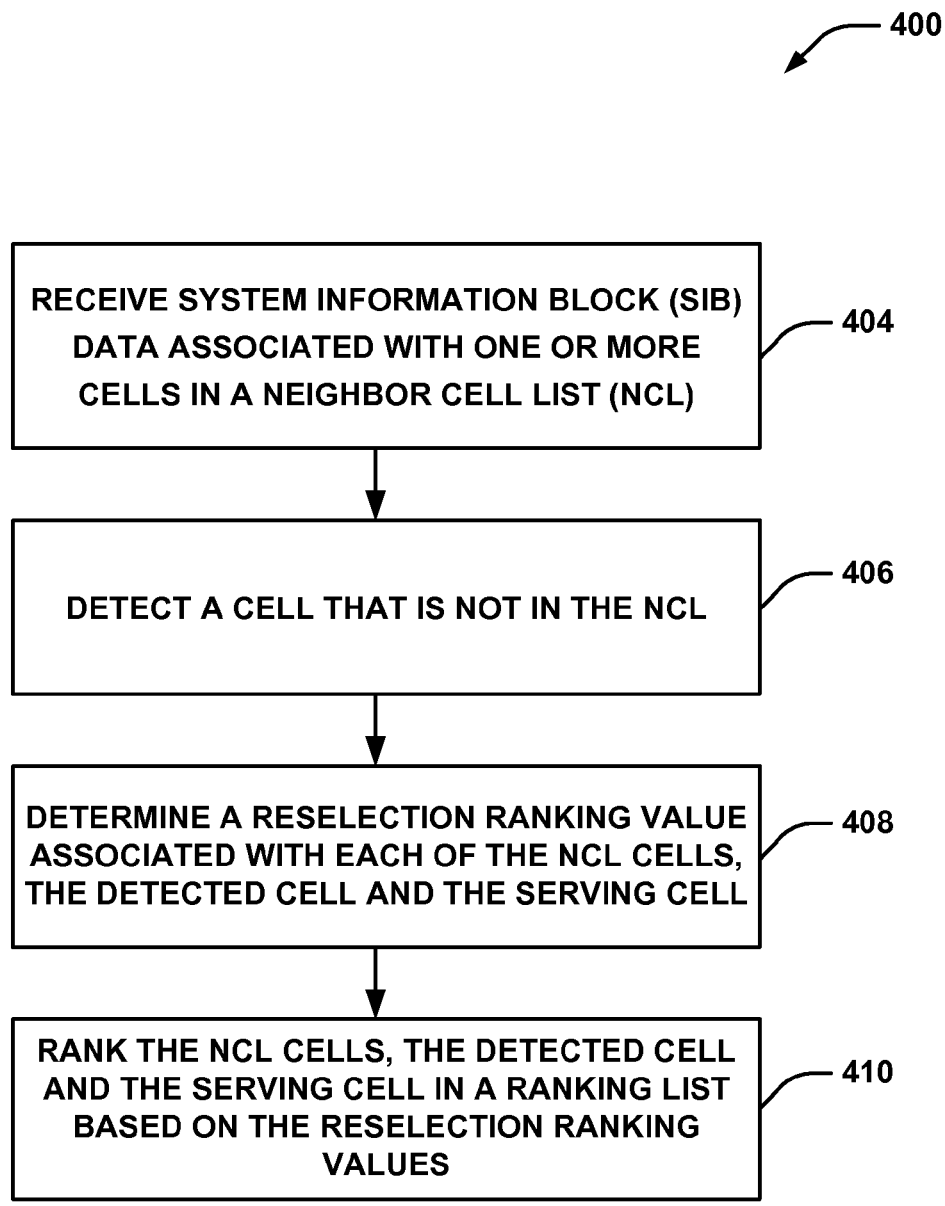
FIG. 4 is a flow diagram illustrating aspects of a method for improved cell reselection according to aspects of the present disclosure.

FIG. 4 illustrates an example methodology 400 for improved UE serving cell reselection. In an aspect, at block 404, methodology 400 may include receiving system information block (SIB) data associated with one or more cells in a neighbor cell list (NCL), wherein the SIB data comprises a ranking offset parameter associated with each of the NCL cells. For example, in an aspect, UE 102, reselection manager 104, and/or SIB parameter receiving component 202 may receive SIB data/information associated with one or more NCL cells in an NCL. In an additional aspect, the UE may also receive SIB information related to its current serving cell.

Furthermore, at block 406, methodology 400 may include detecting a cell that is not in the NCL. For example, in an aspect, UE 102, reselection manager 104, and/or cell detecting component 204 may detect at least one detected cell that is not in the NCL.

Additionally, at block 408, methodology 400 may include determining a reselection ranking value associated with each of the NCL cells, the detected cell and the serving cell. For example, in an aspect, UE 102, reselection manager 104, and/or reselection ranking value determining component 206 may determine a reselection ranking value associated with each of the NCL cells, detected cell and the serving cell. In an aspect, the reselection ranking value(s) may depend upon SIB information received at block 404, such as, but not limited to, one or more $Q_{offset}$ values associated with each NCL cell. For example, in a non-limiting aspect, the UE may set the $Q_{offset}$ value of one or more detected cells (non-NCL cells) to the maximum $Q_{offset}$ value associated with the NCL cells. In an additional aspect, the UE may determine a ranking value associated with its current serving cell.

Furthermore, at block 410, methodology 400 may include ranking the NCL cells, the detected cell and the serving cell in a ranking list based on the reselection ranking values. For example, in an aspect, UE 102, reselection manager 104, and/or cell ranking component 214 may rank the one or more NCL cells and the detected cell in a ranking list based on reselection ranking values. Based on the ranking list, the UE or a network may trigger cell reselection.

Figure 5:
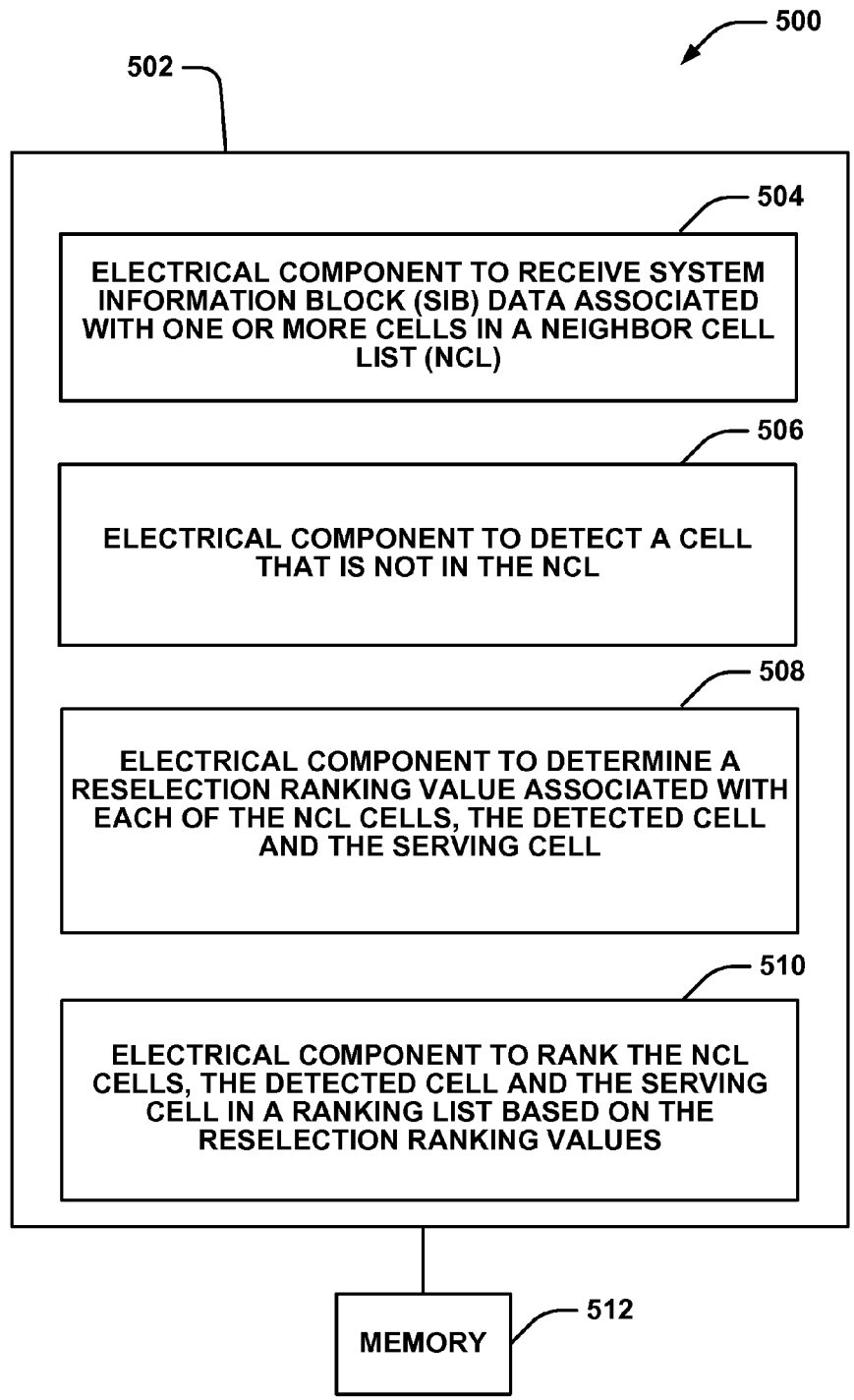
FIG. 5 is a component diagram illustrating aspects of a logical grouping of electrical components as contemplated by the present disclosure.

Referring to FIG. 5, an example system 500 is displayed for improved cell reselection in a wireless communication environment. For example, system 500 can reside at least partially within UE 102 (FIG. 1). It is to be appreciated that system 500 is represented as including functional blocks, which can be functional blocks that represent functions implemented by a processor, software, or combination thereof (for example, firmware). System 500 includes a logical grouping 502 of electrical components that can act in conjunction. For instance, logical grouping 502 can include an electrical component 504 for receiving SIB information associated with one or more neighbor cells in an NCL. In an aspect, electrical component 504 may comprise SIB parameter receiving component 202 (FIG. 2). Additionally, logical grouping 502 can include an electrical component 506 for detecting at least one cell that is not in the NCL. In an aspect, electrical component 506 may comprise cell detecting component 204 (FIG. 2). In an additional aspect, logical grouping 502 can include an electrical component 508 for determining a reselection ranking value associated with each of the one or more NCL cells and the detected cell. In an aspect, electrical component 508 may comprise reselection ranking value determining component 206 (FIG. 2). Furthermore, logical grouping 502 can include an electrical component 510 for ranking the one or more NCL cells and the detected cell in a ranking list based on reselection ranking values. In an aspect, electrical component 510 may comprise cell ranking component 214 (FIG. 2).

Additionally, system 500 can include a memory 512 that retains instructions for executing functions associated with the electrical components 504, 506, 508, and 510, stores data used or obtained by the electrical components 504, 506, 508, and 510, etc. While shown as being external to memory 512, it is to be understood that one or more of the electrical components 504, 506, 508, and 510 can exist within memory 512. In one example, electrical components 504, 506, 508, and 510 can comprise at least one processor, or each electrical component 504, 506, 508, and 510 can be a corresponding module of at least one processor. Moreover, in an additional or alternative example, electrical components 504, 506, 508, and 510 can be a computer program product including a computer readable medium, where each electrical component 504, 506, 508, and 510 can be corresponding code.

Figure 6:
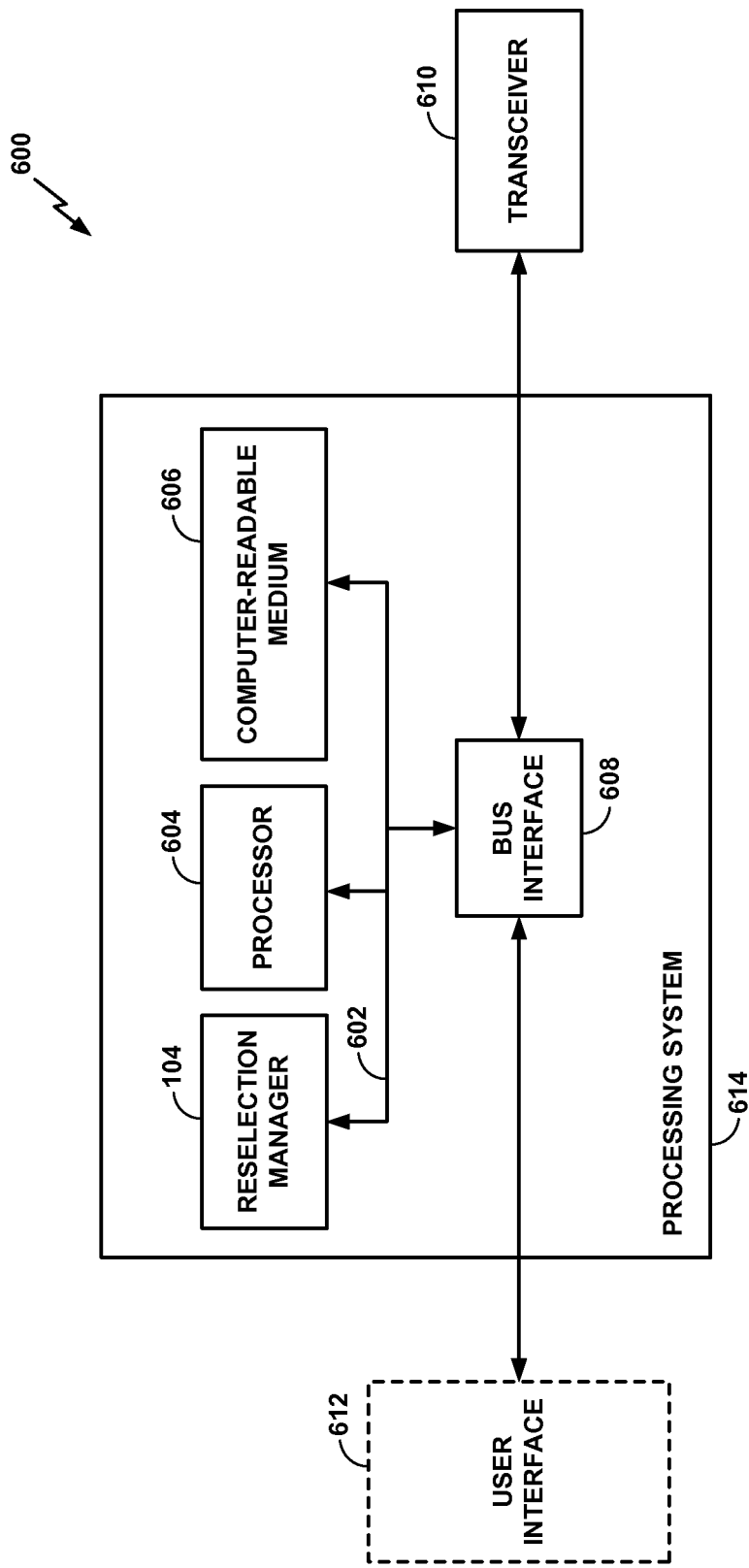
FIG. 6 is a block diagram illustrating an example of a hardware implementation for an apparatus employing a processing system.

FIG. 6 is a block diagram illustrating an example of a hardware implementation for an apparatus 600 employing a processing system 614 for carrying out aspects of the present disclosure, such as methods for improved cell reselection. In this example, the processing system 614 may be implemented with a bus architecture, represented generally by a bus 602. The bus 602 may include any number of interconnecting buses and bridges depending on the specific application of the processing system 614 and the overall design constraints. The bus 602 links together various circuits including one or more processors, represented generally by the processor 604, computer-readable media, represented generally by the computer-readable medium 606, and one or more components described herein, such as, but not limited to, reselection manager 104 (FIGS. 1 and 2). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described infra for any particular apparatus. The computer-readable medium 606 may also be used for storing data that is manipulated by the processor 604 when executing software.

Figure 7:
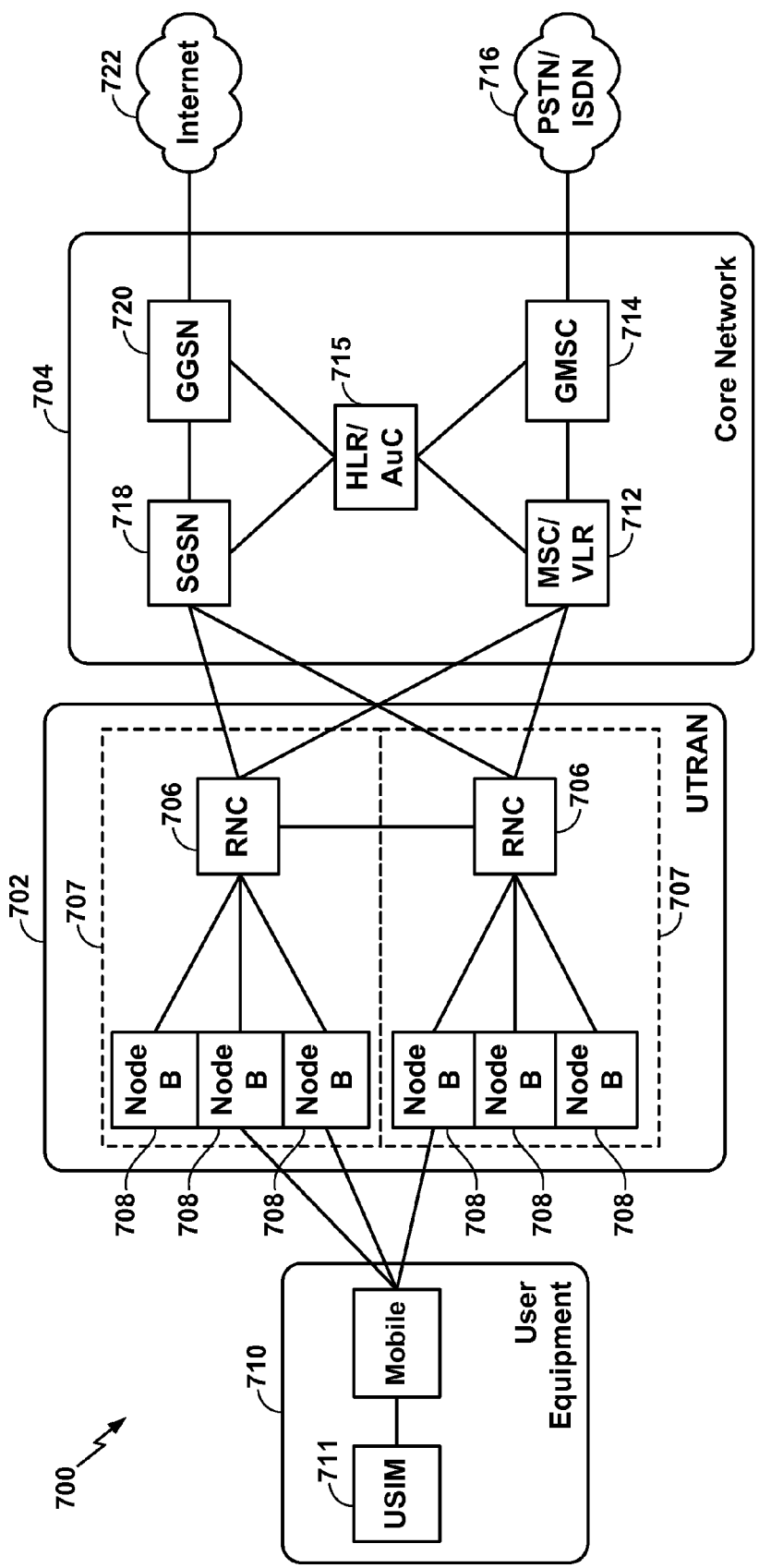
FIG. 7 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 7 are presented with reference to a UMTS system 700 employing a W-CDMA air interface, and may include a UE 102 executing an aspect of reselection manager 104 of FIG. 1. A UMTS network includes three interacting domains: a Core Network (CN) 704, a UMTS Terrestrial Radio Access Network (UTRAN) 702, and UE 104. In an aspect, as noted, UE 710 may be UE 102 (FIG. 1) and may be configured to perform functions thereof, for example, including determining reselection parameters for detected cells of reselection manager 104. Further, UTRAN 702 may comprises first RAT and/or second RAT network entities, such as macro cell network entity 106 and femtocell network entity 108 (FIG. 1), which in this case may be respective ones of the Node Bs 708. In this example, UTRAN 702 provides various wireless services including telephony, video, data, messaging, broadcasts, and/or other services. The UTRAN 702 may include a plurality of Radio Network Subsystems (RNSs) such as an RNS 707, each controlled by a respective Radio Network Controller (RNC) such as an RNC 706. Here, the UTRAN 702 may include any number of RNCs 706 and RNSs 707 in addition to the RNCs 706 and RNSs 707 illustrated herein. The RNC 706 is an apparatus responsible for, among other things, assigning, reconfiguring, and releasing radio resources within the RNS 707. The RNC 706 may be interconnected to other RNCs (not shown) in the UTRAN 702 through various types of interfaces such as a direct physical connection, a virtual network, or the like, using any suitable transport network.

Communication between UE 710 and Node B 708 may be considered as including a physical (PHY) layer and a medium access control (MAC) layer. Further, communication between UE 710 and RNC 706 by way of a respective Node B 708 may be considered as including a radio resource control (RRC) layer. In the instant specification, the PHY layer may be considered layer 1; the MAC layer may be considered layer 7; and the RRC layer may be considered layer 3. Information herein below utilizes terminology introduced in the RRC Protocol Specification, 3GPP TS 75.331 v9.1.0, incorporated herein by reference.

The geographic region covered by the RNS 707 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 708 are shown in each RNS 707; however, the RNSs 707 may include any number of wireless Node Bs. The Node Bs 708 provide wireless access points to a CN 704 for any number of mobile apparatuses, such as UE 102 or 710, and may be macro cell network entity 106 or optional femtocell network entity 108 of FIG. 1. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus in this case is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

In a UMTS system, the UE 710 may further include a universal subscriber identity module (USIM) 711, which contains a user's subscription information to a network. For illustrative purposes, one UE 710 is shown in communication with a number of the Node Bs 708. The DL, also called the forward link, refers to the communication link from a NodeB 708 to a UE 710, and the UL, also called the reverse link, refers to the communication link from a UE 710 to a NodeB 708.

The CN 704 interfaces with one or more access networks, such as the UTRAN 702. As shown, the CN 704 is a GSM core network. However, as those skilled in the art will recognize, the various concepts presented throughout this disclosure may be implemented in a RAN, or other suitable access network, to provide UEs with access to types of CNs other than GSM networks.

The CN 704 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 704 supports circuit-switched services with a MSC 712 and a GMSC 714. In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a VLR that contains subscriber-related information for the duration that a UE is in the coverage area of the MSC 712. The GMSC 714 provides a gateway through the MSC 712 for the UE to access a circuit-switched network 716. The GMSC 714 includes a home location register (HLR) 715 containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR 715 to determine the UE's location and forwards the call to the particular MSC serving that location.

The CN 704 also supports packet-data services with a serving GPRS support node (SGSN) 718 and a gateway GPRS support node (GGSN) 720. GPRS, which stands for General Packet Radio Service, is designed to provide packet-data services at speeds higher than those available with standard circuit-switched data services. The GGSN 720 provides a connection for the UTRAN 702 to a packet-based network 722. The packet-based network 722 may be the Internet, a private data network, or some other suitable packet-based network. The primary function of the GGSN 720 is to provide the UEs 710 with packet-based network connectivity. Data packets may be transferred between the GGSN 720 and the UEs 710 through the SGSN 718, which performs primarily the same functions in the packet-based domain as the MSC 712 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a NodeB 708 and a UE

710. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL). HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 710 provides feedback to Node B 708 over the HS-DPCCH to indicate whether it correctly decoded a packet on the downlink.

HS-DPCCH further includes feedback signaling from the UE 710 to assist the Node B 708 in taking the right decision in terms of modulation and coding scheme and precoding weight selection, this feedback signaling including the CQI and PCI.

HSPA Evolved or HSPA+ is an evolution of the HSPA standard that includes MIMO and 64-QAM, enabling increased throughput and higher performance. That is, in an aspect of the disclosure, the Node B 708 and/or the UE 710 may have multiple antennas supporting MIMO technology. The use of MIMO technology enables the Node B 708 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 710 to increase the data rate or to multiple UEs 710 to increase the overall system capacity. This is achieved by spatially precoding each data stream and then transmitting each spatially precoded stream through a different transmit antenna on the downlink. The spatially precoded data streams arrive at the UE(s) 710 with different spatial signatures, which enables each of the UE(s) 710 to recover the one or more the data streams destined for that UE 710. On the uplink, each UE 710 may transmit one or more spatially precoded data streams, which enables Node B 708 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 8:
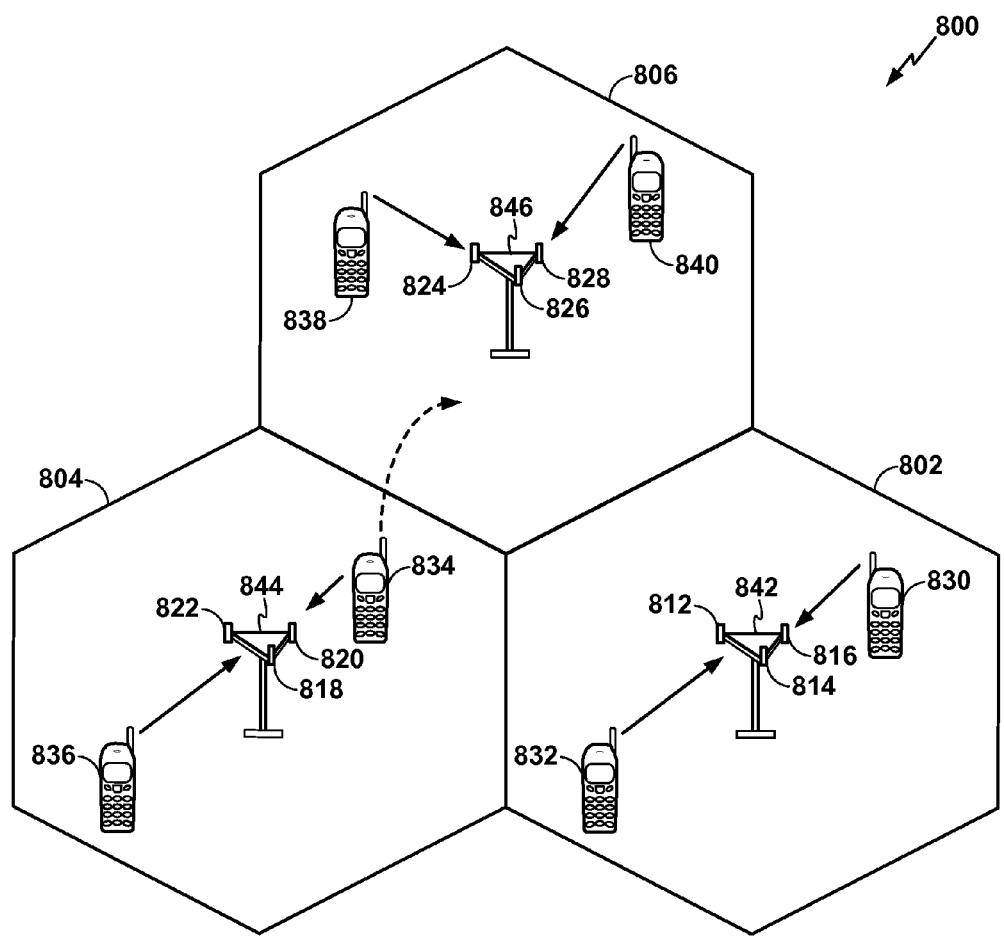
FIG. 8 is a conceptual diagram illustrating an example of an access network.

Referring to FIG. 8, an access network 800 in a UTRAN architecture is illustrated, and may include one or more UEs configured to include reselection manager 104 (FIG. 1) for determining reselection parameters for detected cells. The multiple access wireless communication system includes multiple cellular regions (cells), including cells 802, 804, and 806, each of which may include one or more sectors. The multiple sectors can be formed by groups of antennas with each antenna responsible for communication with UEs in a portion of the cell. For example, in cell 802, antenna groups 812, 814, and 816 may each correspond to a different sector. In cell 804, antenna groups 818, 820, and 822 each correspond to a different sector. In cell 806, antenna groups 824, 826, and 828 each correspond to a different sector. The cells 802, 804 and 806 may include several wireless communication devices, e.g., User Equipment or UEs, for example, including reselection manager 105 of FIG. 1, which may be in communication with one or more sectors of each cell 802, 804 or 806. For example, UEs 830 and 832 may be in communication with NodeB 842, UEs 834 and 836 may be in communication with NodeB 844, and UEs 838 and 840 can be in communication with NodeB 846. Here, each NodeB 842, 844, 846 is configured to provide an access point to a CN 704 (FIG. 7) for all the UEs 830, 832, 834, 836, 838, 840 in the respective cells 802, 804, and 806. Additionally, each NodeB 842, 844, 846 and UEs 830, 832, 834, 836, 838, 840 may be UE 102 of FIG. 1 and may perform the methods outlined herein.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the Node Bs corresponding to the respective cells, at a radio network controller 706 (FIG. 7), or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is simultaneously connected to (i.e., the UTRA cells that are currently assigning a downlink dedicated physical channel DPCH or fractional downlink dedicated physical channel F-DPCH to the UE 834 may constitute the Active Set). In any case, UE 834 may execute reselection manager 104 to perform the reselection operations described herein.

Further, the modulation and multiple access scheme employed by the access network 700 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 9:
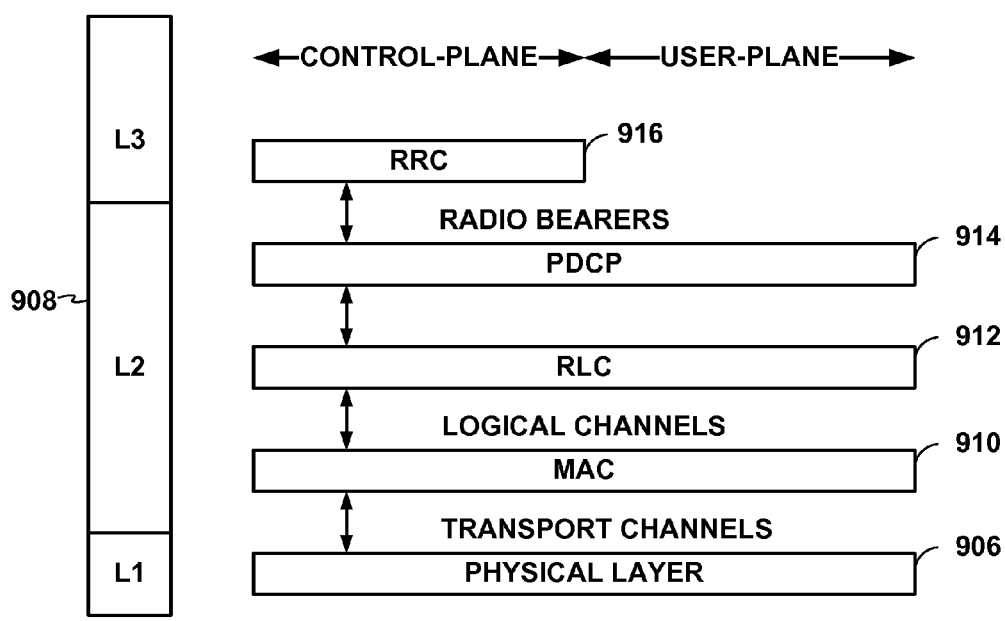
FIG. 9 is a conceptual diagram illustrating an example of a radio protocol architecture for the user and control plane.

The radio protocol architecture may take on various forms depending on the particular application. An example for an HSPA system will now be presented with reference to FIG. 9. FIG. 9 is a conceptual diagram illustrating an example of the radio protocol architecture for the user and control planes.

Turning to FIG. 9, the radio protocol architecture for the UE, for example, UE 102 of FIG. 1 configured to include reselection manager 104 (FIG. 1) for determining reselection parameters for detected cells, and a Node B is shown with three layers: Layer 1, Layer 2, and Layer 3. Layer 1 is the lowest lower and implements various physical layer signal processing functions. Layer 1 will be referred to herein as the physical layer 906. Layer 2 (L2 layer) 908 is above the physical layer 906 and is responsible for the link between the UE and node B over the physical layer 906.

In the user plane, the L2 layer 908 includes a media access control (MAC) sublayer 910, a radio link control (RLC) sublayer 912, and a packet data convergence protocol (PDCP) 914 sublayer, which are terminated at the node B on the network side. Although not shown, the UE may have several upper layers above the L2 layer 908 including a network layer (e.g., IP layer) that is terminated at a PDN gateway on the network side, and an application layer that is terminated at the other end of the connection (e.g., far end UE, server, etc.).

The PDCP sublayer 914 provides multiplexing between different radio bearers and logical channels. The PDCP sublayer 914 also provides header compression for upper layer data packets to reduce radio transmission overhead, security by ciphering the data packets, and handover support for UEs between NodeBs. The RLC sublayer 912 provides segmentation and reassembly of upper layer data packets, retransmission of lost data packets, and reordering of data packets to compensate for out-of-order reception due to hybrid automatic repeat request (HARQ). The MAC sublayer 910 provides multiplexing between logical and transport channels. The MAC sublayer 910 is also responsible for allocating the various radio resources (e.g., resource blocks) in one cell among the UEs. The MAC sublayer 910 is also responsible for HARQ operations.

In the control plane, the radio protocol architecture for the UE and eNB is substantially the same for the physical layer 906 and the L2 layer 908 with the exception that there is no header compression function for the control plane. The control plane also includes a radio resource control (RRC) sublayer 916 in Layer 3 (L3 layer). The RRC sublayer 916 is responsible for obtaining radio resources (i.e., radio bearers) and for configuring the lower layers using RRC signaling between the eNB and the UE.

Figure 10:
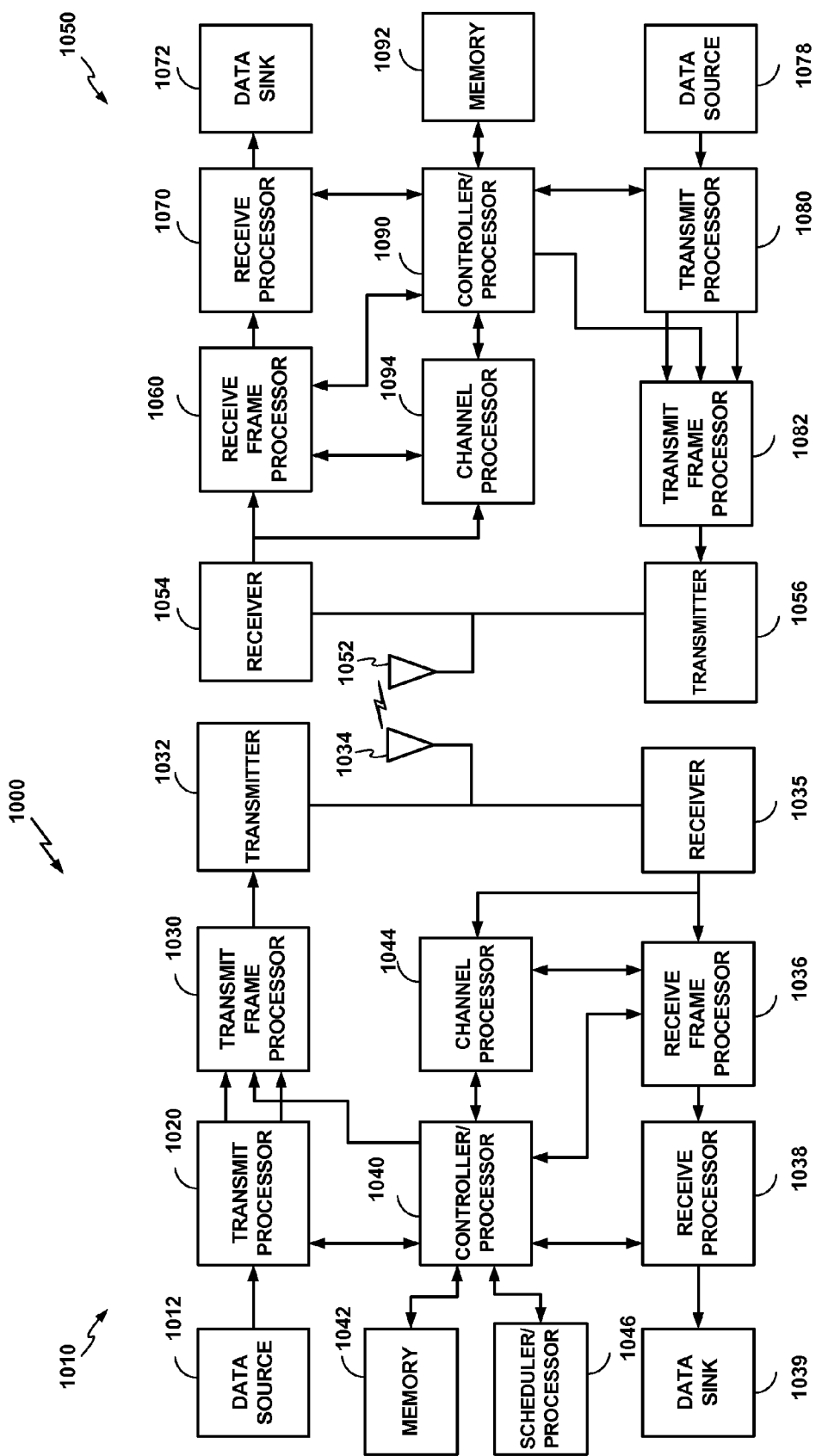
FIG. 10 is a block diagram conceptually illustrating an example of a NodeB in communication with a UE in a telecommunications system.

FIG. 10 is a block diagram of a NodeB 1010 in communication with a UE 1050, where the NodeB 1010 may be the NodeB 1008 in FIG. 10, macro cell network entity 106 or optional femtocell network entity 108, and the UE 1050 may be UE 102 of FIG. 1 configured to include reselection manager 104 (FIG. 1) for determining reselection parameters for detected cells. In the downlink communication, a transmit processor 1020 may receive data from a data source 1012 and control signals from a controller/processor 1040. The transmit processor 1020 provides various signal processing functions for the data and control signals, as well as reference signals (e.g., pilot signals). For example, the transmit processor 1020 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1044 may be used by a controller/processor 1040 to determine the coding, modulation, spreading, and/or scrambling schemes for the transmit processor 1020. These channel estimates may be derived from a reference signal transmitted by the UE 1050 or from feedback from the UE 1050. The symbols generated by the transmit processor 1020 are provided to a transmit frame processor 1030 to create a frame structure. The transmit frame processor 1030 creates this frame structure by multiplexing the symbols with information from the controller/processor 1040, resulting in a series of frames. The frames are then provided to a transmitter 1032, which provides various signal conditioning functions including amplifying, filtering, and modulating the frames onto a carrier for downlink transmission over the wireless medium through antenna 1034. The antenna 1034 may include one or more antennas, for example, including beam steering bidirectional adaptive antenna arrays or other similar beam technologies.

At the UE 1050, a receiver 1054 receives the downlink transmission through an antenna 1052 and processes the transmission to recover the information modulated onto the carrier. The information recovered by the receiver 1054 is provided to a receive frame processor 1060, which parses each frame, and provides information from the frames to a channel processor 1094 and the data, control, and reference signals to a receive processor 1070. The receive processor 1070 then performs the inverse of the processing performed by the transmit processor 1020 in the NodeB 1010. More specifically, the receive processor 1070 descrambles and despreads the symbols, and then determines the most likely signal constellation points transmitted by the NodeB 1010 based on the modulation scheme. These soft decisions may be based on channel estimates computed by the channel processor 1094. The soft decisions are then decoded and deinterleaved to recover the data, control, and reference signals. The CRC codes are then checked to determine whether the frames were successfully decoded. The data carried by the successfully decoded frames will then be provided to a data sink 1072, which represents applications running in the UE 1050 and/or various user interfaces (e.g., display). Control signals carried by successfully decoded frames will be provided to a controller/processor 1090. When frames are unsuccessfully decoded by the receiver processor 1070, the controller/processor 1090 may also use an acknowledgement (ACK) and/or negative acknowledgement (NACK) protocol to support retransmission requests for those frames.

In the uplink, data from a data source 1078 and control signals from the controller/processor 1090 are provided to a transmit processor 1080. The data source 1078 may represent applications running in the UE 1050 and various user interfaces (e.g., keyboard). Similar to the functionality described in connection with the downlink transmission by the NodeB 1010, the transmit processor 1080 provides various signal processing functions including CRC codes, coding and interleaving to facilitate FEC, mapping to signal constellations, spreading with OVSFs, and scrambling to produce a series of symbols. Channel estimates, derived by the channel processor 1094 from a reference signal transmitted by the NodeB 1010 or from feedback contained in the midamble transmitted by the NodeB 1010, may be used to select the appropriate coding, modulation, spreading, and/or scrambling schemes. The symbols produced by the transmit processor 1080 will be provided to a transmit frame processor 1082 to create a frame structure. The transmit frame processor 1082 creates this frame structure by multiplexing the symbols with information from the controller/processor 1090, resulting in a series of frames. The frames are then provided to a transmitter 1056, which provides various signal conditioning functions including amplification, filtering, and modulating the frames onto a carrier for uplink transmission over the wireless medium through the antenna 1052.

The uplink transmission is processed at the NodeB 1010 in a manner similar to that described in connection with the receiver function at the UE 1050. A receiver 1035 receives the uplink transmission through the antenna 1034 and processes the transmission to recover the information modulated onto the carrier. The information recovered by the receiver 1035 is provided to a receive frame processor 1036, which parses each frame, and provides information from the frames to the channel processor 1044 and the data, control, and reference signals to a receive processor 1038. The receive processor 1038 performs the inverse of the processing performed by the transmit processor 1080 in the UE 1050. The data and control signals carried by the successfully decoded frames may then be provided to a data sink 1039 and the controller/processor, respectively. If some of the frames were unsuccessfully decoded by the receive processor, the controller/processor 1040 may also use an acknowledgement (ACK) and/or negative acknowledgement (NACK) protocol to support retransmission requests for those frames.

The controller/processors 1040 and 1090 may be used to direct the operation at the NodeB 1010 and the UE 1050, respectively. For example, the controller/processors 1040 and 1090 may provide various functions including timing, peripheral interfaces, voltage regulation, power management, and other control functions. The computer readable media of memories 1042 and 1092 may store data and software for the NodeB 1010 and the UE 1050, respectively. A scheduler/processor 1046 at the NodeB 1010 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication, comprising:
receiving system information block (SIB) data associated with one or more cells in a neighbor cell list (NCL), wherein the SIB data comprises a ranking offset parameter associated with each of the NCL cells;
detecting a cell that is not in the NCL;
determining a reselection ranking value associated with each of the NCL cells, the detected cell and a serving cell;
ranking the one or more NCL cells, the detected cell and the serving cell in a ranking list based on the reselection ranking values; and
setting a $Q_{offset}$ value associated with the detected cell to zero when a $Q_{offset}$ value associated with each of the one or more NCL cells is a negative value.

2. The method of claim 1, wherein the reselection ranking value associated with each of the NCL cells is determined based at least on the ranking offset parameter associated with the one or more NCL cells.

3. The method of claim 1, wherein the reselection ranking value associated with the detected cell is determined based at least on the ranking offset parameter associated with the one or more NCL cells.

4. The method of claim 1, wherein the SIB data is received by performing an autonomous search function (ASF) as defined in third generation partnership project (3GPP) specifications.

5. The method of claim 1, wherein the detecting further comprises detecting a cell that has a signal-to-noise ratio above a network specified threshold value.

6. The method of claim 1, further comprising:
setting the $Q_{offset}$ value associated with the detected cell to a maximum $Q_{offset}$ value of the one or more NCL cells when the $Q_{offset}$ value associated with each of the one or more NCL cells is a non-negative or positive value.

7. The method of claim 1, further comprising:
reselecting a serving cell at least based on the ranking list.

8. The method of claim 7, wherein the reselecting comprises an inter-frequency or intra-frequency reselection.

9. The method of claim 1, wherein the NCL comprises one or more cell types, and wherein the one or more cell types include macro cells and femtocells.

10. An apparatus for wireless communication, comprising:
means for receiving system information block (SIB) data associated with one or more cells in a neighbor cell list (NCL), wherein the SIB data comprises a ranking offset parameter associated with each of the NCL cells;
means for detecting a cell that is not in the NCL;
means for determining a reselection ranking value associated with each of the NCL cells, the detected cell and a serving cell;
means for ranking the one or more NCL cells, the detected cell and the serving cell in a ranking list based on the reselection ranking values; and
means for setting a $Q_{offset}$ value associated with the detected cell to zero when a $Q_{offset}$ value associated with each of the one or more NCL cells is a negative value.

11. The apparatus of claim 10, wherein the means for determining is further configured to determine the reselection ranking value associated with each of the NCL cells based at least on the ranking offset parameter associated with the one or more NCL cells.

12. The apparatus of claim 10, wherein the means for determining is further configured to determine the reselection ranking value associated with the detected cell based at least on the ranking offset parameter associated with the one or more NCL cells.

13. The apparatus of claim 10, further comprising means for setting the $Q_{offset}$ value associated with the detected cell to a maximum $Q_{offset}$ value of the one or more NCL cells when the $Q_{offset}$ value associated with each of the one or more NCL cells is a non-negative or positive value.

14. The apparatus of claim 10, further comprising means for reselecting a serving cell at least based on the ranking list.

15. A non-transitory computer readable medium storing computer executable code for wireless communication, comprising:
code for receiving system information block (SIB) data associated with one or more cells in a neighbor cell list (NCL), wherein the SIB data comprises a ranking offset parameter associated with each of the NCL cells;
code for detecting a cell that is not in the NCL;
code for determining a reselection ranking value associated with each of the NCL cells, the detected cell and a serving cell;
code for ranking the one or more NCL cells, the detected cell and the serving cell in a ranking list based on the reselection ranking values; and
code for setting a $Q_{offset}$ value associated with the detected cell to zero when a $Q_{offse}$ value associated with each of the one or more NCL cells is a negative value.

16. The computer readable medium of claim 15, wherein the code for determining a reselection ranking value further comprises code for determining a reselection ranking value associated with each of the NCL cells based at least on the ranking offset parameter associated with the one or more NCL cells.

17. The computer readable medium of claim 15, wherein the code for determining reselection ranking value further comprises code for determining reselection ranking value associated with the detected cell based at least on the ranking offset parameter associated with the one or more NCL cells.

18. The computer readable medium of claim 15, further comprising code for setting the $Q_{offset}$ value associated with the detected cell to a maximum $Q_{offset}$ value of the one or more NCL cells when the $Q_{offset}$ value associated with each of the one or more NCL cells is a non-negative or positive value.

19. The computer readable medium of claim 15, further comprising code for reselecting a serving cell at least based on the ranking list.

20. An apparatus for wireless communication, comprising:
a system information block (SIB) parameter receiving component configured to receive SIB data associated with one or more cells in a neighbor cell list (NCL), wherein the SIB data comprises a ranking offset parameter associated with each of the NCL cells;
a cell detecting component configured to detect a cell that is not in the NCL;
a reselection ranking value determining component configured to determine a reselection ranking value associated with each of the NCL cells, the detected cell and a serving cell;
a cell ranking component configured to rank the one or more NCL cells, the detected cell and the serving cell in a ranking list based on the reselection ranking values; and
the reselection ranking value determining component further configured to set a $Q_{offset}$ value associated with the detected cell to zero when a $Q_{offset}$ value associated with each of the one or more NCL cells is a negative value.

21. The apparatus of claim 20, wherein the reselection ranking value determining component is further configured to determine the reselection ranking value associated with each of the NCL cells based at least on the ranking offset parameter associated with the one or more NCL cells.

22. The apparatus of claim 20, wherein the reselection ranking value determining component is further configured to determine reselection ranking value associated with the detected cell based at least on the ranking offset parameter associated with the one or more NCL cells.

23. The apparatus of claim 20, wherein the SIB parameter receiving component is further configured to receive the SIB data by performing an autonomous search function (ASF) as defined in third generation partnership project (3GPP) specifications.

24. The apparatus of claim 20, wherein the cell detecting component is further configured to detect a cell that has a signal-to-noise ratio above a network specified threshold value.

25. The apparatus of claim 20, wherein the reselection ranking value determining component is further configured to set the $Q_{offset}$ value associated with the detected cell to a maximum $Q_{offset}$ value of the one or more NCL cells when the $Q_{offset}$ value associated with each of the one or more NCL cells is a non-negative or positive value.

* * * * *